United States Patent [19]

Hosokawa

[11] Patent Number: 5,790,909
[45] Date of Patent: Aug. 4, 1998

[54] PULSE GENERATOR HAVING SIMPLIFIED CONDUCTOR ARRANGEMENT

[75] Inventor: Tetsuo Hosokawa, Tokyo, Japan

[73] Assignee: Asahi Kogaku Kogyo Kabushiki Kaisha, Tokyo, Japan

[21] Appl. No.: 711,268

[22] Filed: Sep. 9, 1996

[30] Foreign Application Priority Data

Sep. 11, 1995 [JP] Japan .................... 7-233062

[51] Int. Cl.⁶ .................... G03B 17/00
[52] U.S. Cl. .................... 396/395; 396/542; 341/16
[58] Field of Search .................... 396/395, 396, 396/439, 542, 543, 406, 409; 341/16

[56] References Cited

U.S. PATENT DOCUMENTS

| | | | |
|---|---|---|---|
| 4,135,065 | 1/1979 | Nicot | 200/11 DA |
| 4,522,506 | 6/1985 | Owa | 358/500 |
| 4,687,308 | 8/1987 | Someya | 396/299 |
| 4,742,367 | 5/1988 | Amano et al. | 396/543 X |
| 4,816,851 | 3/1989 | Fukahori et al. | 396/406 |
| 4,918,474 | 4/1990 | Kawamura et al. | 396/407 |
| 5,016,031 | 5/1991 | Shimada et al. | 396/413 |
| 5,369,230 | 11/1994 | Misawa | 200/52 R |
| 5,596,381 | 1/1997 | Murakami et al. | 396/207 |

FOREIGN PATENT DOCUMENTS

| | | |
|---|---|---|
| 1109903 | 4/1968 | United Kingdom . |
| 1162050 | 8/1969 | United Kingdom . |
| 1182681 | 3/1970 | United Kingdom . |
| 1565890 | 4/1980 | United Kingdom . |

*Primary Examiner*—Safet Metjahic
*Assistant Examiner*—J. K. Han
*Attorney, Agent, or Firm*—Greenblum & Bernstein P.L.C.

[57] ABSTRACT

A pulse generator includes a code plate which is provided with a plurality of grounding land portions and a plurality of pulse generating land portions having a potential different from a potential of the grounding land portions, arranged in a direction of rotation about a specific position, and a pair of interconnected contact terminals which are rotated in one direction about the specific position of the code plate to come successively into contact with the grounding land portions and the pulse generating land portions. The positional relationship between the contact terminals and the grounding land portions and the pulse generating land portions is such that when one of the contact terminals comes into contact with the pulse generating land portions during the rotation of the contact terminals, the other contact terminal is brought into contact with the grounding land portion.

14 Claims, 7 Drawing Sheets

PULSE GENERATOR HAVING SIMPLIFIED CONDUCTOR ARRANGEMENT

BACKGROUND OF THE INVENTION

1. Field of the Invention

The present invention relates to a pulse generator in which a pair of contact terminals connected to each other are brought into contact with a code plate to produce pulses.

2. Description of the Related Art

In a known pulse generator which is adapted to detect the feed of a film in a camera, a pair of interconnected contact terminals, which are rotated in association with the rotation of a sprocket, when the film is wound, are brought into contact with a code plate which is secured to the camera body to produce pulses. The drive motor is stopped when a predetermined number of pulses corresponding to the feed of one frame of the film are produced, signifying that the film is wound by one frame. In the known pulse generator as mentioned above, a brush, (having a pair of contact terminals connected to each other) is rotated in a predetermined direction in association with the winding operation of the film to contact a code plate. The code plate is provided with a predetermined conductor pattern. The pulse generator generates a predetermined number of pulses in accordance with the number of times a change in potential is produced when the brush comes into contact with the code plate.

In the known pulse generator, the contact terminals of the brush are located at different radial positions. The code plate is provided on an inner peripheral portion (i.e. an inner radial area) thereof with a grounding land, to which only one of the contact terminals of the brush is selectively brought into contact, the code plate is further provided on an outer peripheral portion (i.e., an outer radial area) with a pulse generating land, to which the other contact terminal comes into contact. Consequently, the size of the code plate is inevitably large in the radial direction. Hence, the ability to obtain a reduction in size of the pulse generator is restricted.

Moreover, in the above-mentioned conventional pulse generator, it is necessary to provide a plurality of pulse generating lands, the number of pulse generating lands corresponding to the number of pulses to be produced during one rotation of the brush. The pulse generating lands are spaced at an equi-angular distance between grounding lands, the grounding lands being provided on the outer peripheral portion of the code plate and extending outwardly in the radial direction. In other words, the outer grounding lands on the outer peripheral portion of the code plate have to be connected to the inner grounding lands on the inner peripheral portion. In addition, the pulse generating lands are insulated from the outer grounding lands. Pulses are generated each time one of the contact terminals comes into contact with the pulse generating lands, since the other contact terminal is always in contact with the inner grounding lands. Therefore, if, for example, 6 pulses are to be generated by one rotation of the brush, 6 pulse generating lands must be provided among the outer grounding lands. This arrangement has required a complicated conductor pattern of the code plate, thus resulting in a high production cost.

Summary of the Invention

It is an object of the present invention to provide a small and simple pulse generator in which the conductor pattern of the code plate can be easily simplified.

Another object of the present invention to provide a small and simple pulse generator for a camera, which can contributes to a miniaturization of a camera.

According to the present invention, there is provided a pulse generator comprising a code plate which is provided with a plurality of grounding land portions and a plurality of pulse generating land portions having a potential different from a potential of the grounding land portions, said grounding land portions and said pulse generating land portions being arranged successively in a direction of rotation about a specific position, and a pair of interconnected contact terminals which are rotated in one direction about the specific position of the code plate to come successively into contact with the grounding land portions and the pulse generating land portions, wherein the positional relationship between the contact terminals, the grounding land portions, and the pulse generating land portions is such that when one of the contact terminals contacts with the pulse generating land portions during the rotation of the contact terminals, the remaining contact terminal is brought into contact with the grounding land portion.

The contact terminals can be arranged to rotate symmetrically with respect to the center of rotation thereof. Preferably, the pulse generating land portions are arranged so that when the contact terminals rotate at a constant speed, each of the contact terminals comes into contact with the pulse generating land portions at an equal time interval for an identical duration.

According to another aspect of the present invention, there is provided a pulse generator for a camera comprising a rotary member which is rotated in accordance with the feed of a film, a pair of interconnected contact terminals secured to the rotary member, and a code plate provided with a plurality of grounding land portions and a plurality of pulse generating land portions having a potential different from a potential of the grounding land portions, the grounding land portions and the pulse generating land portions being arranged in a direction of rotation about a specific position, so that the contact terminals can be successively brought into contact with the grounding land portions and the pulse generating land portions, wherein the positional relationship between the contact terminals and the grounding land portions and the pulse generating land portions is such that when one of the contact terminals comes into contact with the pulse generating land portions during the rotation of the contact terminals, the remaining contact terminal is brought into contact with the grounding land portion.

BRIEF DESCRIPTION OF THE DRAWINGS

The invention will be described below in detail with reference to the accompanying drawings, in which.

DESCRIPTION OF THE PREFERRED EMBODIMENT

Embodiments on the present invention will be explained in accordance with the drawings.

Figure 7:
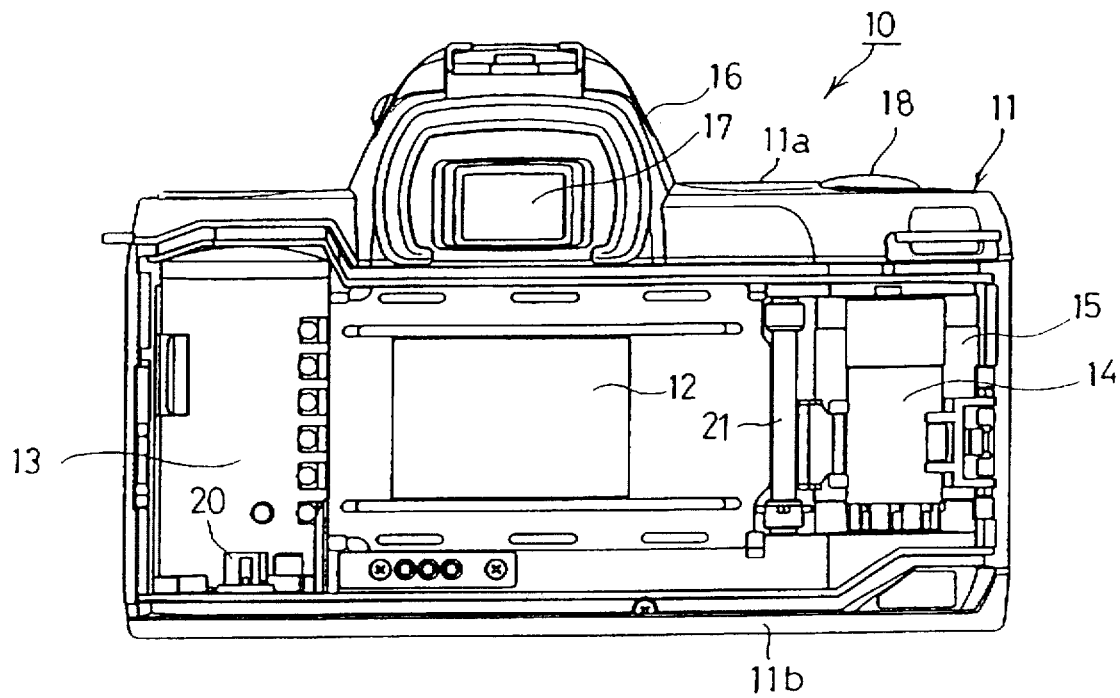
FIG. 7 is a back view of a single lens reflex camera having the pulse generator incorporated therein, according to the present invention.

FIG. 7 shows a single lens reflex camera (in which a basic cover is not depicted) having a pulse generator according to the present invention. The camera 10 includes a camera body 11 which is provided with a central aperture 12. There are provided a film cartridge compartment 13 in which a film cartridge is loaded, and a spool compartment 14 in which a winding spool 14 is provided to wind a film F (FIG. 1), the leading end of the film F being discharged from the cartridge compartment 13. There is provided a sprocket 21 opposed to the spool compartment 15. The sprocket 21 is arranged to be rotated during the winding operation of the film. The camera body 11 is provided, on the upper wall 11a, with a pentagonal prism portion 16 in which a pentagonal prism is housed, a view finder 17, and a release button 18.

Figure 1:
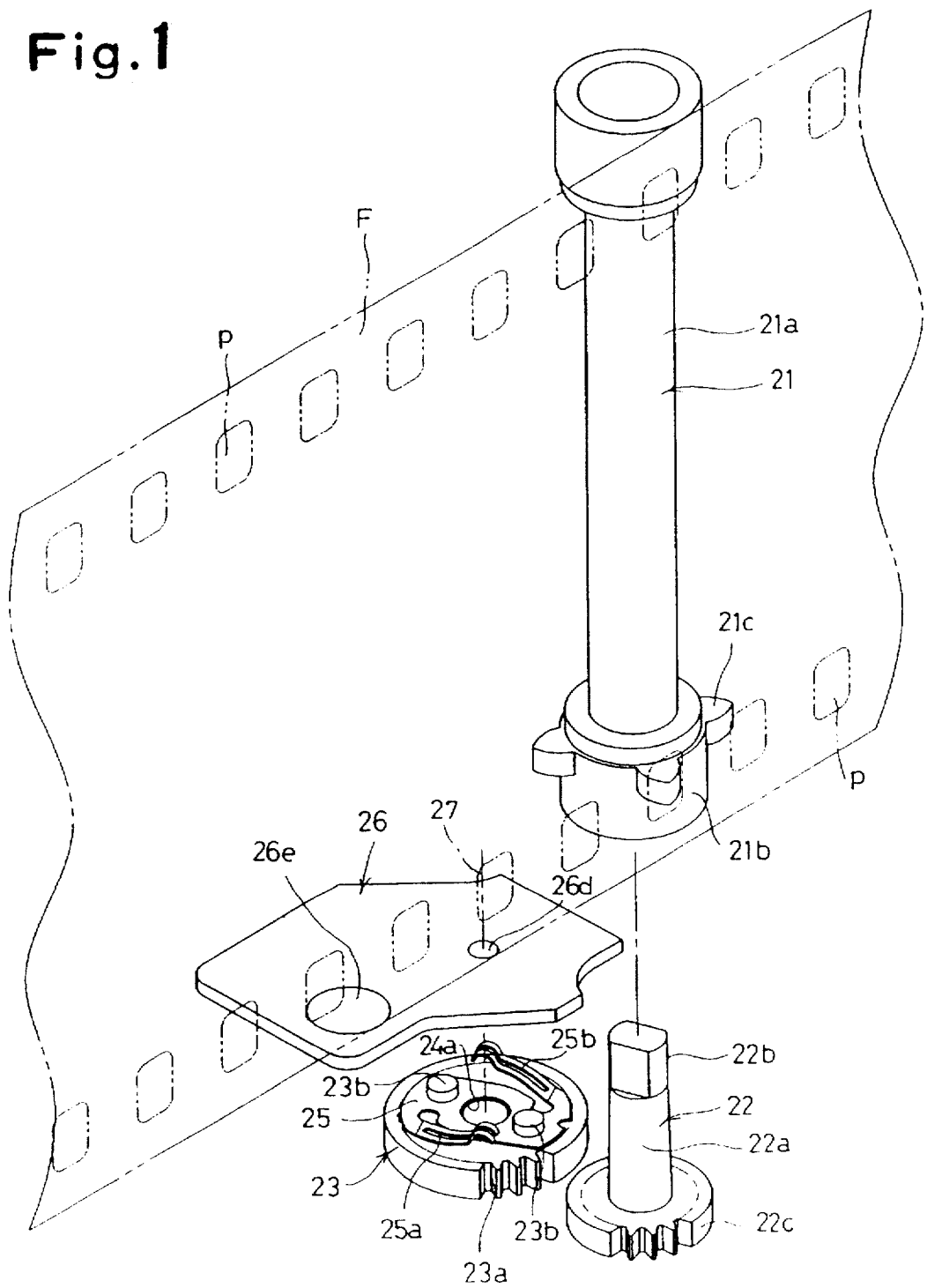
FIG. 1 is a perspective view of a pulse generator according to the present invention adapted to detect the feed of film in a camera.
Figure 6:
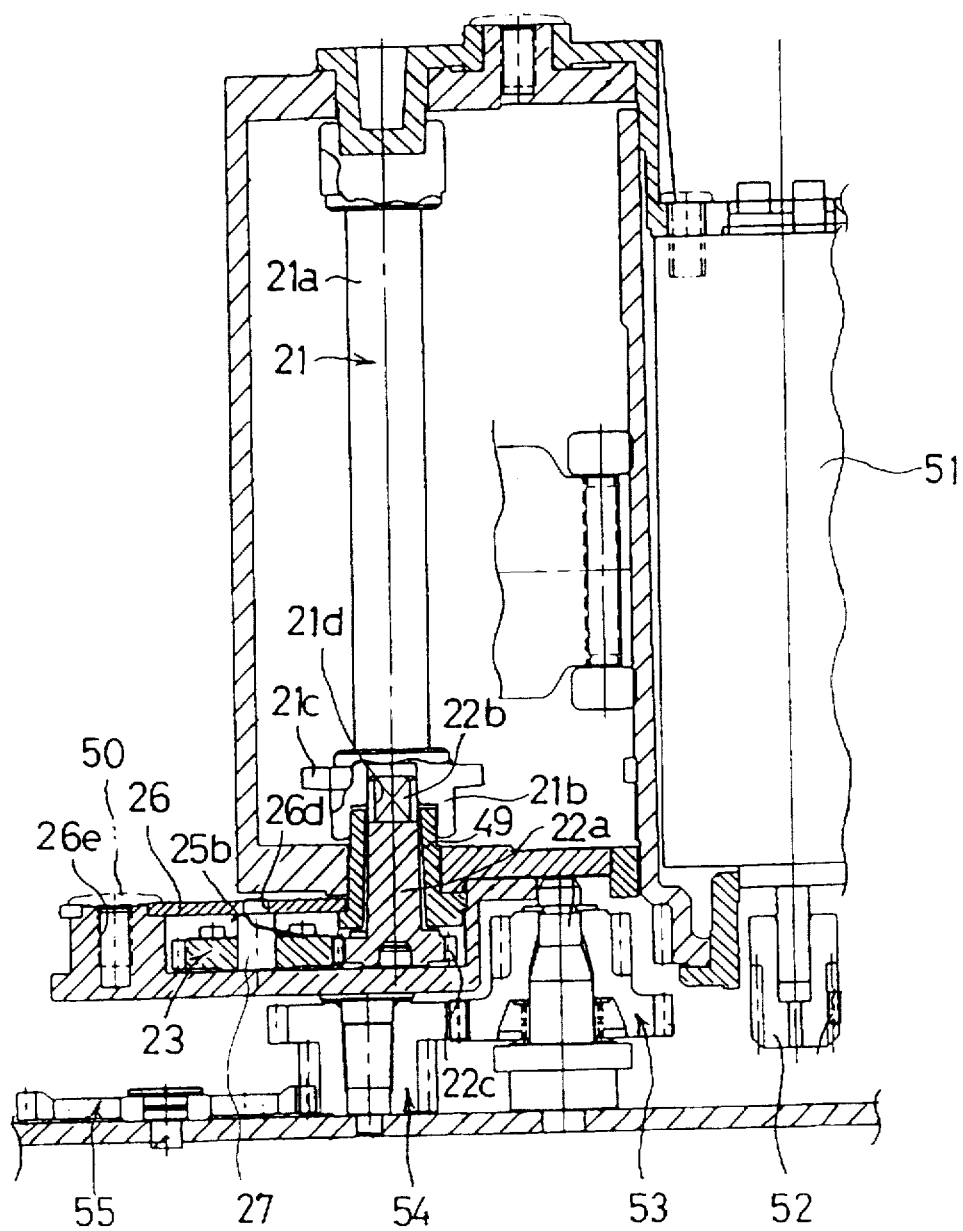
FIG. 6 is a sectional view of main components of a camera having the pulse generator incorporated therein, according to the present invention.

As shown in FIGS. 1 and 6, the sprocket 21 is provided with a shaft portion 21a rotatably supported by the camera body 11; four engaging teeth 21c which are engaged in perforations (sprocket holes) p of the film F; and a gear support 21b. A shaft portion 22a of a transmission gear 22, which rotates together with the sprocket 21, is inserted in the gear support 21b. The transmission gear 22 is provided, on one end of the shaft portion 22a, with a key portion 22b which engages in a key hole 21d formed in the gear support 21b. The transmission gear 22 is also provided with a gear portion 22c at the other end of the shaft portion 22a.

FIG. 6, shows a sleeve 49 secured to the camera body 11 to rotatably support the shaft portion 22a of the transmission gear 22 (which extends upward therethrough); a drive motor 51 adapted to wind and rewind the film; a pinion 52 secured to the drive shaft of the drive motor 51; a first double gear 53 rotated by the drive motor 51 through an intermediate gear (not shown); and, a second double gear 54 which transmits the rotation of the first double gear to a large diameter gear 55 of a rewinding gear train.

The code plate 26 is secured to the camera body 11 by a screw 50. A pulse generating gear 23 opposes the lower surface of the code plate 26, and is rotatably supported by a shaft 27. The pulse generating gear 23 meshes with the gear portion 22c of the transmission gear 22. The pulse generating gear 23 has an axial hole 24a formed therein in which the shaft 27 is inserted. The pulse generating gear 23 also includes a pair of engaging projections 23b which are the axis of the symmetrically arranged on opposite sides of axial hole 24a.

Figure 2:
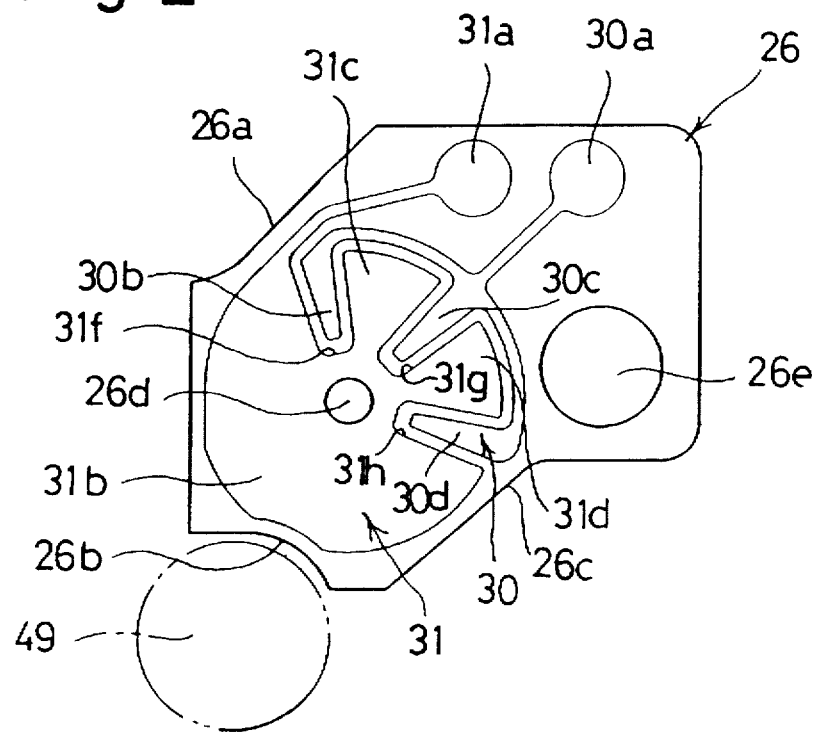
FIG. 2 is a bottom view of a code plate of the pulse generator according to the present invention.

As shown in FIG. 2 (which shows the bottom surface of the code plate 26), the code plate 26 is provided with: peripheral recesses (cut-away portions) 26a and 26c; a recess 26b which is adapted to prevent the sleeve 49 from interfering with the code plate 26 when the code plate is secured to the camera body 11; a bearing hole 26d to which the shaft 27 of the pulse generating gear 23 is inserted; and a threaded hole 26e, in which the screw 50 is screwed to secure the code plate 26 to the camera body 11. The code plate 26 is also provided with a grounding terminal 31 whose potential is zero (0 V), and a pulse generating terminal 30 whose potential is higher (or lower) than the potential of the grounding terminal 31 by a predetermined voltage.

The grounding terminal 31 is provided with a connecting portion 31a to which a lead wire (conductor) is soldered to connect the grounding terminal 31 to a control portion (not shown). The grounding terminal 31 is also provided with a plurality (in this case three) of grounding land portions 31b, 31c and 31d arranged in this order in the direction of rotation with respect to the axis (specific position) of the bearing hole 26d. The pulse generating terminal 30 has a connecting portion 30a, to which a lead wire (conductor) is soldered to connect the pulse generating terminal 30 to the control portion. The pulse generating terminal 30 is also provided with a plurality (in this case three) of pulse generating land portions 30b, 30c and 30d arranged in this order in the direction of rotation with respect to the axis of the bearing hole 26d. The potential of the grounding land portions 31b, 31c and 31d is different from that of the pulse generating land portions.

The pulse generating land portions 30b, 30c and 30d are positioned such that when the contact terminals 25a and 25b rotate at a constant speed with respect to the code plate 26, one of the contact terminals 25a and 25b comes into contact with the pulse generating land portions at an equal time interval for an identical duration of time. Moreover, insulating recesses 31f, 31g and 31h are formed by cutting away the grounding terminal 31 between the grounding land portions 31b, 31c, and 31d and the pulse generating land portions 30b, 30c, and 30d, respectively.

The grounding land portions 31c and 31d extend radially and outwardly from the grounding land portion 31b, on the side opposite to the grounding land portion 31b (with respect to the bearing hole 26d). The surface area of the grounding land portions 31c and 31d is smaller than the surface area of the grounding land portion 31b. The surface area of the grounding land portion 31b is formed so that when one of the contact terminals 25a and 25b successively comes into contact with the pulse generating land portions 30d, 30c and 30b, during one rotation of the brush 24 (for example, in the counterclockwise direction in FIG. 2) with respect to the code plate 26, the other contact terminal 25b or 25a is continuously in contact with the grounding land portion 31b. In other words, the grounding land portion 31b located between the insulating recesses 31f and 31h extends over 180° of the grounding terminal 31 in the direction of rotation of the brush about the axis of the bearing hole 26d.

Figure 3:
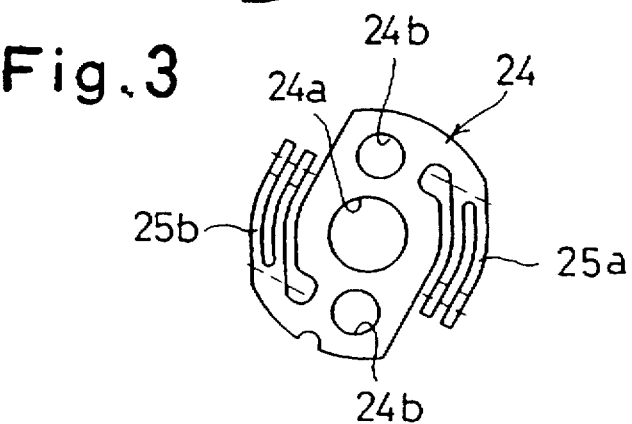
FIG. 3 is a bottom view of a brush of the pulse generator according to the present invention.

The brush 24 secured to the pulse generating gear 23 is provided with a center axial hole 24a through which the shaft 27 extends, and a pair of engaging holes 24b which are arranged pulse generating terminal 30 symmetrically on opposite side of, the axis of the center hole 24a, so that the engaging projections 23b of the pulse generating gear 23 can be fitted, as shown in FIG.3. The brush 24 is also provided with a pair of contact terminals 25a and 25b, which are symmetrically arranged about the axis of the center hole 24a, and which are angularly separated from the engaging holes 24b by 90°. The contact terminals 25a and 25b are symmetrically opposed to each other with respect to the center hole 24a and are electrically interconnected. In an assembled state of the brush 24 and the code plate 26 (FIG. 4), the brush 24 can be rotated in one direction (the counterclockwise direction in FIG. 4) about the axis of the bearing hole 26d (i.e., the specific position of the code plate 26) to successively come into contact with the grounding land portions 31b, 31c and 31d and the pulse generating land portions 30b, 30c and 30d.

Figure 4:
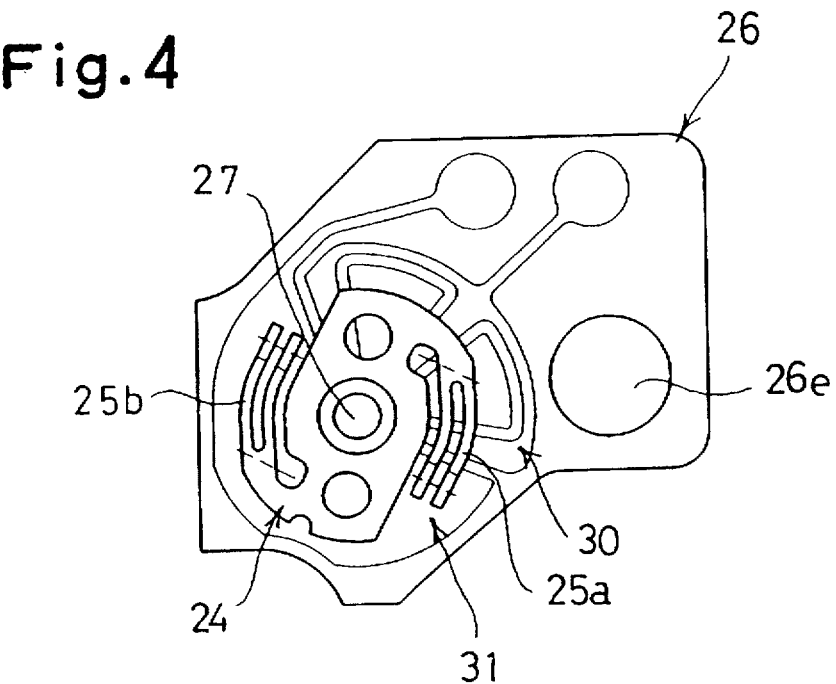
FIG. 4 is a bottom view of an assembly of the code plate and the brush in the pulse generator according to the present invention.
Figure 5:
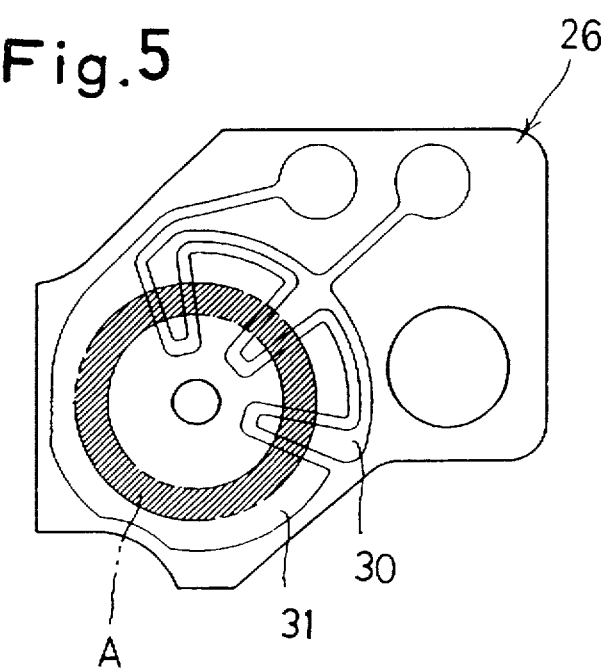
FIG. 5 is a bottom view of the code plate to show a locus of the rotational movement of a brush in a pulse generator according to the present invention.

When the code plate 26 and the brush 24 are assembled as shown in FIG. 4, the positional relationship between the contact terminals 25a, 25b and the grounding land portions 31b, 31c, 31d and the pulse generating land portions 30b, 30c, 30d is such that when one of the contact terminals 25a and 25b comes into contact with the pulse generating land portions 30d, 30c and 30b during the rotation of the contact terminals, the remaining on of the contact terminals 25a and 25b is brought into contact with the grounding land portion 31b. Note that "A" in FIG. 5 represents the locus of the rotational movement of the contact terminals 25a and 25b.

The operation of the pulse generator will be explained hereinafter. When the release button 18 is depressed after the film cartridge is loaded in the film cartridge compartment, the drive motor 51 is driven in accordance with the signal issued by the depression of the release button 18 to rotate the film winding spool 14 through a predetermined intermediate transmission means (not shown). Consequently, upon winding the film F is moved in the right hand direction in FIG. 1, so that the sprocket 21 (having engaging teeth 21c are engaged in the perforations p of the film F) is rotated in the counterclockwise direction. As a result, the pulse generating gear 23 is rotated in the clockwise direction via the transmission gear 22, and the brush 24 is rotated in the clockwise direction together with the pulse generating gear 23. That is, in FIG. 4, the brush 24 is rotated in the counterclockwise direction with respect to the code plate 26.

If the contact terminals 25a, 25b are moved from the position shown in FIG. 4 by 180° (one half turn) in the counterclockwise direction during the rotation of the brush 24, the contact terminal 25b is moved from one end of the grounding land portion 31b to the other of the grounding land portion 31b, the other contact terminal 25a is disconnected from the other end of the grounding land portion 31b and comes successively into contact with the pulse generating land portions 30d, the grounding land portion 31d, the pulse generating land portion 30c and the grounding land portion 31c. Thereafter, the contact terminal 25a moves to one end of the pulse generating land portion 30b. Since the contact terminal 25a comes successively into contact with the pulse generating land portions 30d, 30c and 30b, while keeping the contact terminal 25b in contact with the grounding land portion 31b, three pulses are produced during half rotation of the brush 24. Similarly, three pulses are produced during the remaining half rotation of the brush 24 in which the positional relationship between the contact terminals 25a and 25b is reversed. Thus, six pulses are obtained by the assembly of the code plate 26 and the brush 24 during one turn of the brush 24.

FIGS. 10 through 13 show a comparative example of a pulse generator which is illustrative of the problems overcome by the present invention.

In the comparative example, a pair of contact terminals 45a and 45b of the brush 44 are asymmetrically arranged with respect to the axis of the rotation and are located at different radial distances from the axis of the rotation. The code plate 36 is provided with an inner grounding terminal 41 with which only one of the contact terminals 45a and 45b comes into contact, and outer pulse generating land portions 40b, 40c, 40d, 40e, and 40f of the pulse generating terminal 40 that are arranged (in this order) in the direction of the rotation of the brush about the axis of the bearing hole 36d. The potential of the pulse generating terminal 40 is different from that of the grounding terminal 41. The grounding terminal 41 is provided with a connecting portion 41a and a plurality of electrically interconnected grounding land portions 41b through 41g which extend outwardly in the radial directions, and which are circumferentially arranged in this order around the bearing hole 36d. Consequently, the size of the code plate 36 in the radial direction is increased, and hence the miniaturization of the code plate is restricted to some extent, contrary to the need for a miniaturization of camera components.

Figure 10:
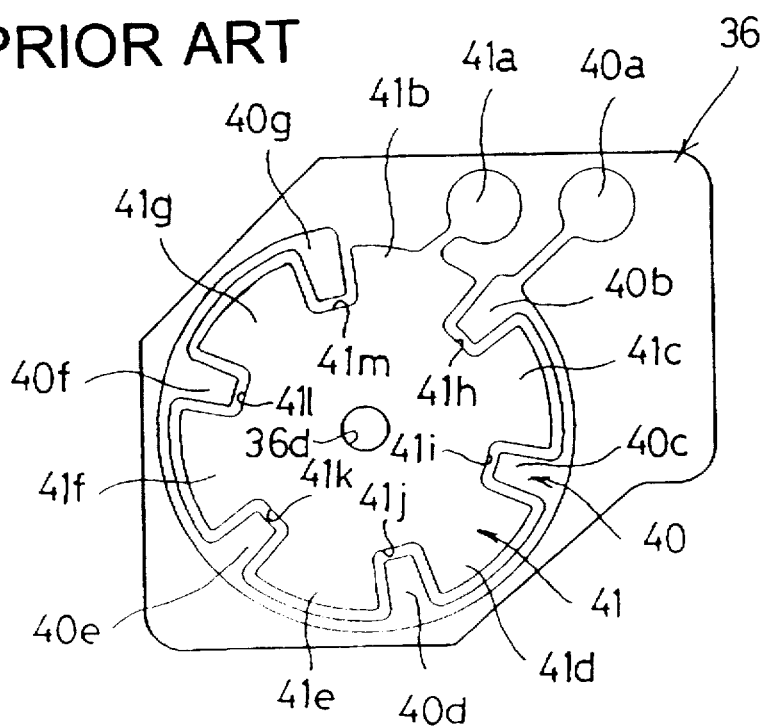
FIG. 10 is a bottom view of a comparative code plate in a pulse generator.
Figure 11:
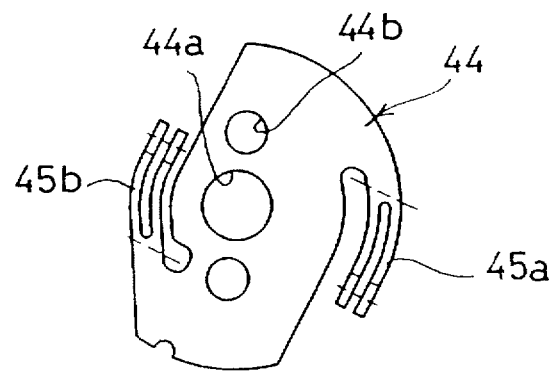
FIG. 11 is a bottom view of a brush for the comparative code plate shown in FIG. 10.
Figure 12:
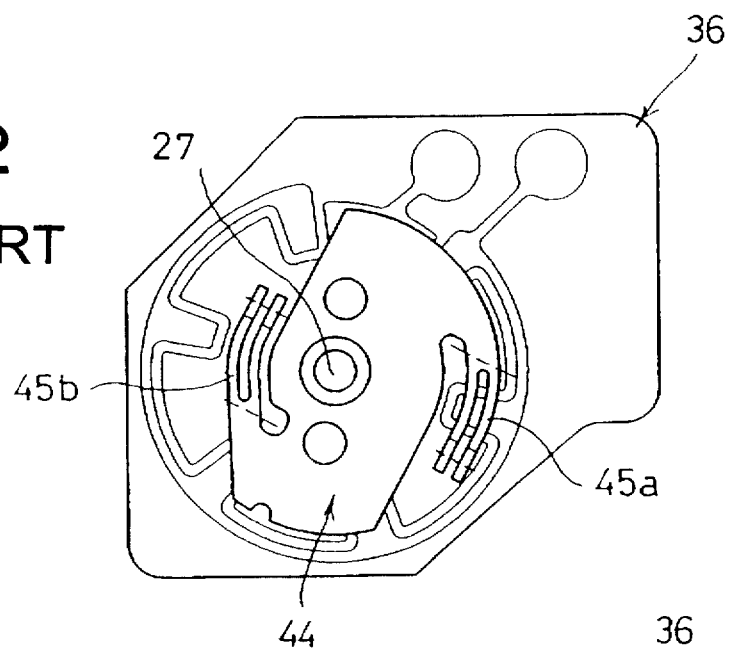
FIG. 12 is a bottom view of an assembly of the comparative code plate and the brush shown in FIGS. 10 and 11; and, FIG. 13 is a bottom view of a pulse generator showing locus of the rotational movement of the brush shown in FIG. 12.
Figure 13:
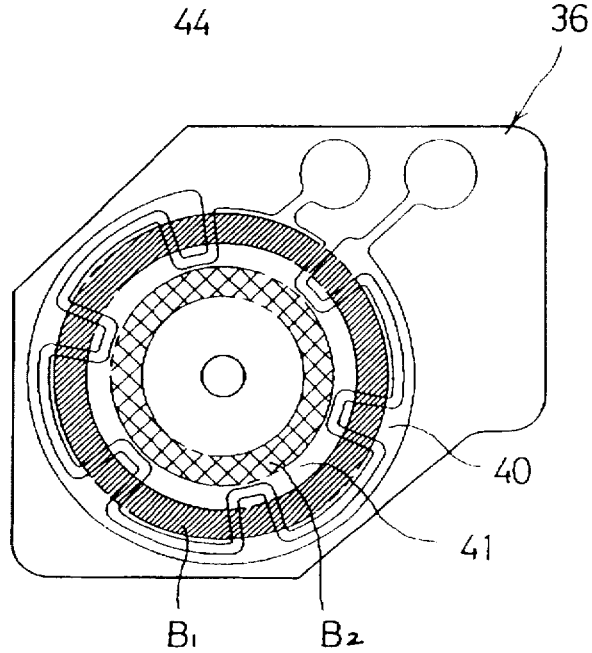

In FIG. 10, the numeral 40a designates the connecting portion, and the numerals 41h through 41m designate the insulating recesses formed between the grounding land portions 41b through 41g and the pulse generating land portions 40b through 40f, respectively. In FIG. 13, B1 and B2 represent the loci of the rotational movement of the contact terminals 45a and 45b of the brush 44, respectively.

In the pulse generator shown in FIGS. 10 through 13, the outer pulse generating land portions 40b through 40f are located at a substantially equal angular intervals and are separated by the adjacent grounding land portions 41b through 41g that are connected to and extend outwardly in the radial directions from the inner grounding land portion. The number of the pulse generating land portions corresponds to the number of pulses to be produced during one rotation of the brush 44. Since a pulse is produced each time one of the contact terminals comes into contact with the pulse generating land portions 40b through 40f, while keeping the other contact terminal in contact with inner peripheral portion of the grounding terminal 41, it is necessary to provide the same number of pulse generating land portions (protruding between the adjacent grounding land portions) the number of the pulses to be produced during one turn of the brush 44. This arrangement requires a complicated conductor pattern of the code plate 36, thus leading to an increase in the manufacturing cost of the camera.

Unlike this comparative example of a generator a pulse generator according does the present invention to not require a grounding land portion on the inner peripheral portion of the code plate, in that one or the other of the contact terminals 25a and 25b is always brought into contact with the grounding land portion. Moreover, according to the present invention, the number of the pulse generating land portions 30b, 30c and 30d that protrude between the adjacent grounding land portions 31b, 31c and 31d is one-half of the number of the pulses to be produced by one turn of the brush. Thus, the structure of the pulse generator can be simplified. Furthermore, the code plate 26 can be provided with a cutaway portion 26b, and accordingly, the code plate can be made small. Consequently, not only can the pulse generator be reduced in size as a whole, but also a compact camera can be obtained.

Second and third embodiments of the present invention, in which conductor pattern of the code plate is different from that in the first embodiment, are discussed below with reference to FIGS. 8 and 9. In the second and third embodiments, the shape of the brush 24 is identical to that of the brush 24 in the first embodiment.

Figure 8:
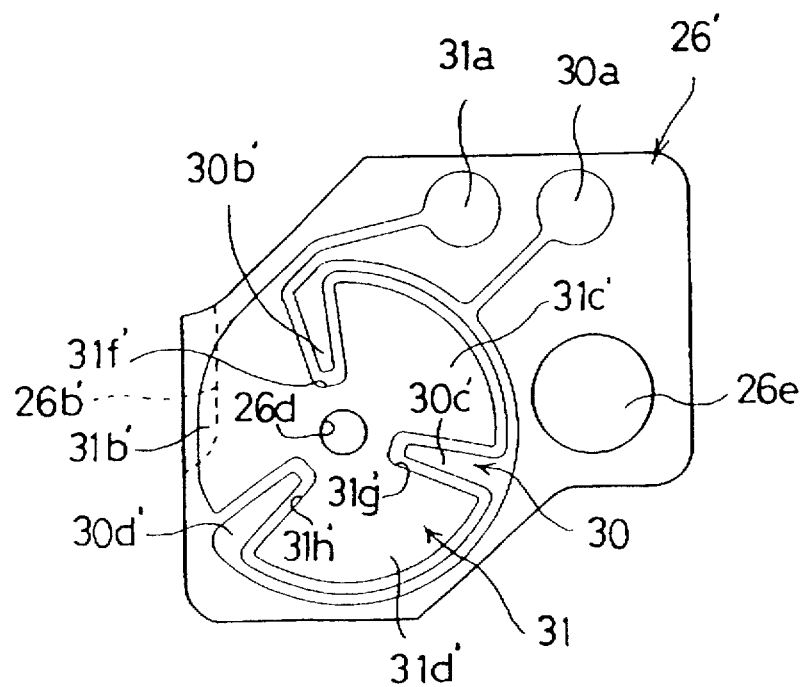
FIG. 8 is a bottom view of a code plate in a second embodiment of a pulse generator according to the present invention.

In the second embodiment of a pulse generator having a code plate 26' shown in Fig.8, the number of the pulses produced by one rotation of the brush 24 is identical to that in the first embodiment. The code plate 26' is provided with a grounding land portions 31b' which is identical in the surface area to the remaining grounding land portions 31c', 31d', in place of the larger grounding land portion 31b in the first embodiment. The grounding land portions 31b', 31c' and 31d' are spaced at an equal angular intervals and define therebetween insulating recesses 31f, 31g' and 31h' in which the pulse generating land portions 30b', 30c' and 30d' are located. When the contact terminals 25a and 25b rotate at a constant speed, one or the other of the contact terminals 25a and 25b comes into contact with the pulse generating land portions at an equal time intervals for an identical duration.

With the second embodiment of a pulse generator having the code plate 26', the positional relationship between the contact terminals 25a, 25b and the grounding land portions 31b', 31c', 31d' and the pulse generating land portions 30b', 30c', 30d'is such that when one of the contact terminals 25a and 25b comes into contact with the pulse generating land portions 30b' through 30d' during the rotation of the contact terminals, the other contact terminal is brought at the same position as the recess 26b in the first embodiment, but a recess 26' is formed on the left end portion of the plate on which there is no pulse generating land portion 30b', 30c' or 30d', corresponding to the grounding land portion 31b' as indicated by a phantom line shown in FIG. 8, for the purpose of miniaturization of the code plate 26'.

Figure 9:
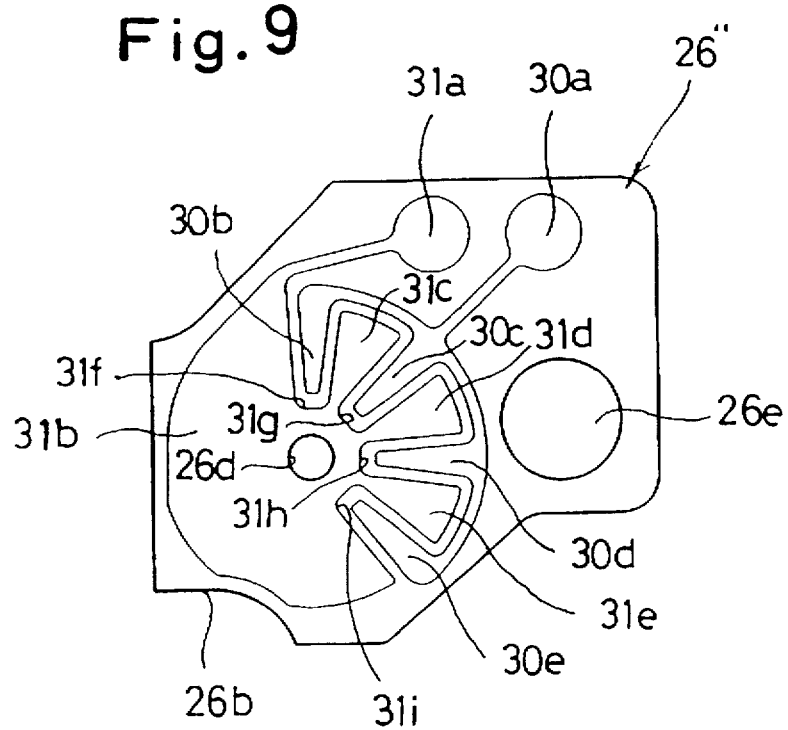
FIG. 9 is a bottom view of a code plate in a third embodiment of a pulse generator according to the present invention.

In the third embodiment a pulse generator having a code plate 26" shown in Fig.9, eight pulses are produced by one rotation of the brush 24. In other words, the code plate 26" shown in FIG. 9 is provided with a grounding land portion 31b whose shape is similar to the shape of that in the first embodiment, but the distance between the adjacent pulse generating land portions 30b, 30c and 30d is slightly smaller than that in the first embodiment. Consequently, the code plate 26" includes an additional pulse generating land portion 30e. With this arrangement, when the contact terminals 25a and 25b rotate at a constant speed, one or the other of the contact terminals 25a and 25b comes into contact with the pulse generating land portions 30b, 30c, 30d and 30e, at an identical time interval for an identical period of time.

In the third embodiment, the positional relationship between the contact terminals 25a, 25b and the grounding land portions 31b through 31e and the pulse generating land portions 30b through 30e is such that when one of the contact terminals 25a and 25b comes into contact with the pulse generating land portions 30e, 30d, 30c and 30b during the rotation of the contact terminals, the other contact terminal is brought into contact with the grounding land portion 31b. Accordingly, the same effect as that of the first embodiment can be obtained in the third embodiment. Note that in the third embodiment, the recess 26b to prevent an interference with the sleeve 29 (FIG. 2) is formed on the same portion of the code plate as that in the first embodiment.

As can be understood from the above discussion, according to the present invention, since the electrically interconnected contact terminals, the grounding land portions, and the pulse generating land portions are positioned so that when one of the contact terminals comes into contact with the pulse generating land portions during the rotation of the contact terminals, the remaining contact terminal is brought into contact with the grounding land portion, not only can the conductor pattern of the code plate be simplified, but also the pulse generator can be miniaturized. Moreover, according to the present invention, since a pair of interconnected contact terminals are secured to a rotary member (rotated in accordance with the feed of the film) and the contact terminals, and the grounding land portions and the pulse generating land portions are positioned such that when one of the contact terminals comes into contact with the pulse generating land portions during the rotation of the contact terminals, the remaining contact terminal is brought into contact with the grounding land portion, the pulse generator can be simplified and miniaturized, thus resulting in a contribution to a realization of a compact camera.

What is claimed is:

1. A pulse generator comprising:
   a code plate provided with a plurality of grounding land portions and a plurality of pulse generating land portions having a potential different from a potential of the grounding land portions; and,
   a pair of electrically interconnected contact terminals each contactable to said grounding land portions and said pulse generating land portions, said pair of electrically interconnected contact terminals are provided to a rotating member;
   wherein a positional relationship between said contact terminals, said grounding land portions, and said pulse generating land portions is such that when one of said contact terminals contacts said pulse generating land portions, the remaining contact terminal contacts a corresponding one of said grounding land portions, and wherein within one rotation of said rotating member, each of said pair of contact terminals alternates between contacts with all of said grounding land portions and all of said pulse generating land portions.

2. The pulse generator according to claim 1, wherein said contact terminals are arranged to rotate symmetrically about the center of rotation thereof.

3. The pulse generator according to claim 1, wherein said pulse generating land portions are arranged so that when said contact terminals rotate at a constant speed, each of the contact terminals comes into contact with the pulse generating land portions at an equal interval for an identical duration.

4. The pulse generator according to claim 3, wherein the number of said plural pulse generating lands is set to be a half of the number of pulses to be generated by one rotation of said pair of contact terminals.

5. The pulse generator according to claim 4, wherein said pair of contact terminals are formed symmetrically on a plate to be rotated about an axis.

6. The pulse generator according to claim 5, wherein said plate on which said pair of contact terminals are provided and said code plate are arranged to relatively rotate around said axis.

7. The pulse generator according to claim 6, wherein said grounding lands and said pulse generating lands are formed to radially extend from said axis.

8. The pulse generator according to claim 7, wherein said pulse generating lands are located around an outer periphery of said grounding lands, so that each of said pulse generating lands is arranged to be located between said grounding lands.

9. A pulse generator for a camera, comprising:
   a member which is rotationally moved in accordance with the feed of a film;
   a pair of electrically interconnected contact terminals secured to said member; and,
   a code plate which is provided with a plurality of grounding land portions and a plurality of pulse generating land portions having a potential different from a potential of said grounding land portions, each of said pair of electrically interconnected contact terminals contactable to said grounding land portions and said pulse generating land portions;

wherein said positional relationship among said contact terminals and said grounding land portions said pulse generating land portions is such that when one of said contact terminals comes into contact with said pulse generating land portions, the remaining contact terminal contacts a corresponding one of said grounding land portions, and wherein within one rotation of said member, each of said pair of contact terminals alternates between contacts with all of said grounding land portions and all of said pulse generating land portions.

10. The pulse generator for a camera, according to claim 9, wherein said member is a rotary gear that is arranged to connect to a film rewinding mechanism provided in said camera.

11. The pulse generator for a camera, according to claim 10, wherein said film rewinding mechanism comprises a spool chamber to which a film is rewound, and a sprocket for moving said film to said spool.

12. The pulse generator for a camera, according to claim 11, wherein said sprocket include a transmission gear provided at an end of said sprocket to mesh with said gear on which said pair of contact terminals are provided.

13. The pulse generator according to claim 12, wherein the number of said plural pulse generating lands is set to be a half of the number, of pulses to be generated by one rotation of said pair of contact terminals.

14. A pulse generator comprising:

a code plate having a plurality of grounding land portions and a plurality of pulse generating land portions distributed about a center of said code plate, each of said plurality of grounding land portions and each of said plurality of pulse generating land portions occupying a same radius about said center; and, two equiangularly distributed and electrically interconnected contact terminals provided to a rotating member rotatable about said center, each of said two contact terminals rotating through said same radius about said center and alternating between contact to each of said plurality of grounding land portions and to each of said plurality of pulse generating land portions.

* * * * *